R. A. B. WALSH.
METHOD OF AND MACHINE FOR MAKING WIRE GLASS.
APPLICATION FILED DEC. 2, 1907.
940,841.
Patented Nov. 23, 1909.
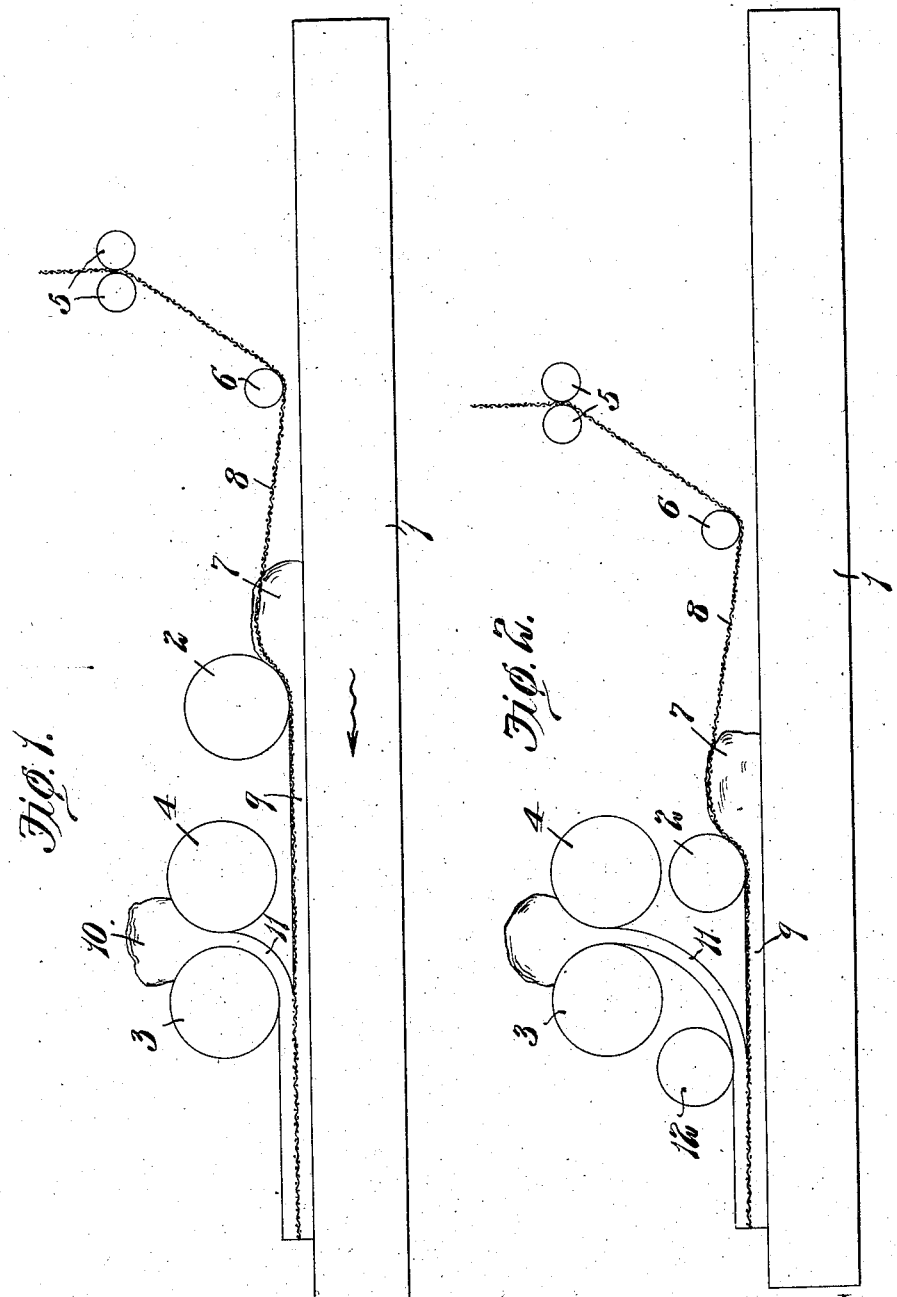

UNITED STATES PATENT OFFICE.

ROBERT A. B. WALSH, OF ST. LOUIS, MISSOURI.

METHOD OF AND MACHINE FOR MAKING WIRE-GLASS.

940,841.

Specification of Letters Patent. Patented Nov. 23, 1909.

Application filed December 2, 1907. Serial No. 404,849.

*To all whom it may concern:*

Be it known that I, ROBERT A. B. WALSH, a citizen of the United States, residing at St. Louis, Missouri, have invented a certain new and useful Improvement in Methods of and Machines for Making Wire-Glass, of which the following is a full, clear, and exact description, such as will enable others skilled in the art to which it appertains to make and use the same, reference being had to the accompanying drawings, forming part of this specification, in which—

Figures 1 and 2 are side elevations of different forms of apparatus which may be used in practicing my invention.

This invention relates to a new and useful method of, and a machine for making wire glass, and particularly wire glass in which a plurality of layers are employed to form the ultimate sheet.

The object of my invention is to produce a sheet of wire glass having smooth brilliant surfaces, the wire of said sheet retaining its original bright and new appearance after it has been embedded in the glass.

In the manufacture of wire glass, the tendency of the wire is to contract and "draw" the glass so as to produce an uneven or an irregular surface. It has been proposed, see for illustration the patent to Walsh, No. 610,593, dated September 13, 1898, to cure these irregularities by smoothing them down by a finishing roller; but this cannot always be successfully accomplished, because, while the finishing roller acts upon the elevations, it will not perfectly transfer the surplus glass to the depressions and make a perfect weld. It has also been proposed, see for illustration the Schmertz reissue patent No. 12,443, dated January 30, 1906, to press the wire mesh into the top surface of a first formed sheet or layer of glass and then spread a finishing layer or sheet of molten glass thereover. This method produces a better and smoother finish to the top surface of the sheet than the Walsh method first-mentioned. In both of these methods, the wire, on account of its exposure to atmosphere after being heated, loses its bright and new appearance and looks black in the finished sheet. In the Schmertz method the weld between the two layers occurs principally in the plane of the wire, and as the wire is at places left free to "draw" this action is sometimes observed on the surface of the second layer.

Briefly stated, my present method consists in forming a sheet or layer of glass and drawing a wire mesh into said layer so that it is completely covered and thereafter forming a second sheet or layer of glass and combining it with the layer that was first formed, the second sheet or layer being welded to that surface of the first-formed sheet or layer into which the wire mesh was drawn. Preferably, the wire mesh is drawn into the upper surface of the first-formed layer at the same time said layer is being formed so that in its heated condition the wire mesh will not be exposed to atmosphere and will accordingly preserve its bright and new appearance in the finished product.

It is obvious that various forms of apparatus could be used for practicing my method and I have herein shown two forms of apparatus, that which is illustrated in Fig. 1 comprising a table 1 having a smooth surface roller 2 arranged above the upper surface thereof and adapted to spread a mass of molten glass over the table to form the bottom layer or sheet, and a pair of smooth surface rollers 3 and 4 for forming a separate mass of molten glass into a top layer or sheet, the roller 3 coöperating with the table to combine the two layers or sheets together to form a single sheet of glass. Said apparatus also comprises a pair of tension rolls 5 through which the wire mesh passes and a guide roll 6 so disposed relatively to the roller 2 that the wire mesh will be drawn into the upper surface of the bottom layer as said layer is being formed. In practicing my method with an apparatus of this description, a mass of molten glass 7 is dumped onto the table adjacent the roller 2 and the wire mesh 8 which passes between the tension rolls 5 and underneath the guide rolls 6 is interposed between the roller 2 and the mass of molten glass 7. The table is then moved in the direction of the arrow so that the mass of glass 7 will be formed into a bottom layer 9, the tension rolls and guide roll causing the wire mesh to cut its way into the mass of glass 7 so that said mesh will be completely covered by glass and thus be prevented from oxidizing as would be apt to occur if it was exposed to atmosphere while in its heated condition from contact with the molten glass. When the front end of the bottom layer or sheet having the wire mesh embedded therein reaches the rollers 3 and 4, a second mass of molten glass 10 is dumped between these rollers which form said mass into a top layer or sheet 11 which is welded to the uneven upper surface of the bottom layer 9 by the smooth surface roller 3. Although I have previously stated that the table is moved longitudinally it will, of course, be understood that this table could be stationary and the rollers, tension rolls and guide roll be moved longitudinally thereof without departing from the spirit of my invention.

In Fig. 2 I have shown another form of apparatus which could be used for practicing my method. This apparatus consists of a table 1 having a smooth surface roller 2, tension rolls 5 and a guide roll 6 similar to those in the apparatus shown in Fig. 1 for forming the mass of molten glass 7 into a bottom layer or sheet and causing the wire mesh 8 to cut its way into the upper surface of said sheet so that it will be completely embedded. The top layer or sheet 11 is formed by means of smooth surface rollers 3 and 4, and said top layer combined with the bottom layer 9 by means of a smooth surface roller 12 arranged above the table a distance equal to the thickness of the finished product or sheet of wire glass.

It will be observed from the foregoing that a complete sheet of wire glass is first formed, to wit, a sheet or layer of glass with wire buried beneath its upper surface and finally a finishing layer of glass is formed and combined with the previously formed sheet or layer, the finishing layer of glass filling in the spaces in the first-formed sheet caused by the wire mesh cutting its way into said sheet and becoming thoroughly welded to the upper surface of said sheet. Thus the tendency of the wire to "draw" in contracting and produce an irregular or uneven surface on the first-formed sheet is corrected by the second layer which not only fills in the unevenness in the first-formed sheet or layer but said second layer more readily partakes of and retains the smooth even surface imparted by the smooth surface roller which combines the two sheets or layers of glass together.

Having thus described my invention, what I claim as new and desire to secure by Letters Patent is:

1. An apparatus for making wire glass, comprising means for forming a mass of molten glass into a layer or sheet, means for drawing a wire mesh into said sheet so that it is completely covered, and means for forming a second layer or sheet and combining it with the first-formed sheet in which the wire mesh is embedded; substantially as described.

2. An apparatus for making wire glass, comprising means for forming a sheet or layer of glass, tension devices for drawing the wire mesh into one surface of said sheet so that it is completely covered, and means for forming a second layer or sheet of glass and welding it to the uneven surface of the first-formed sheet into which the wire mesh was drawn; substantially as described.

3. An apparatus for forming wire glass, comprising means for forming a sheet or layer of glass, tension devices for drawing a wire mesh into one surface of said sheet or layer simultaneously with the operation of forming said sheet, and means for forming a second sheet or layer of glass and welding it to the uneven surface of the first-formed sheet or layer into which the wire mesh is drawn; substantially as described.

4. An apparatus for making wire glass, comprising means for forming a sheet or layer of glass, tension devices for drawing a wire mesh into the upper surface of said sheet, and means for forming a second sheet or layer of glass and welding it to the upper surface of the sheet in which the wire mesh is embedded; substantially as described.

5. An apparatus for forming wire glass, comprising means for forming a sheet or layer of glass, tension devices for causing a wire mesh to cut its way into the upper surface of said sheet at the time it is being formed, means for forming a second sheet or layer of glass, and independent means for welding said second sheet to the upper surface of the sheet in which the wire mesh is embedded; substantially as described.

6. An apparatus for forming wire glass, comprising means for rolling a mass of molten glass into a layer, means for causing a wire mesh to cut its way into said layer, means for rolling a second mass of molten glass into a layer which passes onto the upper surface of the layer in which the wire mesh is embedded, and means for combining said layers together to form a single sheet; substantially as described.

7. An apparatus for forming wire glass, comprising a table, a smooth surface roller arranged above said table for forming a mass of molten glass into a bottom layer or sheet, tension rolls and a guide roll so disposed relatively to said roller that a wire mesh interposed between said roller and the mass of molten glass will cut its way into said mass as it is being formed into a sheet, and a second pair of rolls for forming an independent mass of glass into a top layer, one of said rollers operating to weld the top layer to the upper surface of the layer in which the wire mesh is embedded; substantially as described.

8. The method of making wire glass, which consists in forming a sheet of glass, drawing a wire mesh into said sheet so that it is completely covered, and progressively forming a second sheet or layer of glass and combining it with the first-formed sheet or layer; substantially as described.

9. The method of making wire glass, which consists in forming a sheet or layer of glass, drawing a wire mesh into said sheet so that it is completely covered, and thereafter forming a second sheet or layer of glass and welding it to that surface of the first-formed sheet or layer into which the wire mesh was drawn; substantially as described.

10. The method of making wire glass, which consists in first forming a sheet or layer of glass and simultaneously drawing a wire mesh into one surface of said sheet so that it is completely covered, and thereafter forming a second sheet or layer of glass and welding it to that surface of the first-formed sheet or layer into which the wire mesh was drawn; substantially as described.

11. The method of making wire glass, which consists in forming a mass of molten glass into a layer or sheet, and simultaneously drawing a wire mesh into the upper surface of said sheet and thereafter forming a second sheet or layer of glass and welding it to the upper surface of the first-formed sheet into which the wire mesh was drawn; substantially as described.

12. The method of making wire glass, which consists in rolling a mass of molten glass into layer form and simultaneously drawing a wire mesh beneath the upper surface thereof so that it is completely covered, rolling a separate mass of molten glass into layer form and arranging it upon the upper surface of the first-formed layer and thereafter combining said layers into a single sheet; substantially as described.

In testimony whereof I hereunto affix my signature in the presence of two witnesses, this twenty-sixth day of November 1907.

ROBERT A. B. WALSH.

Witnesses:
F. R. CORNWALL,
GEORGE BAKEWELL.